G. R. WELLER.
SEED CORN TESTING IMPLEMENT.
APPLICATION FILED SEPT. 16, 1920.
1,411,823.
Patented Apr. 4, 1922.
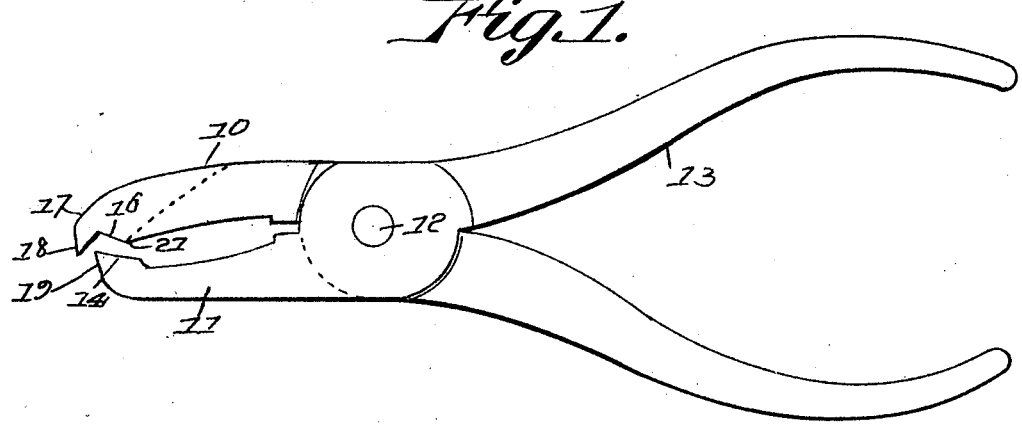
*Fig. 1.*
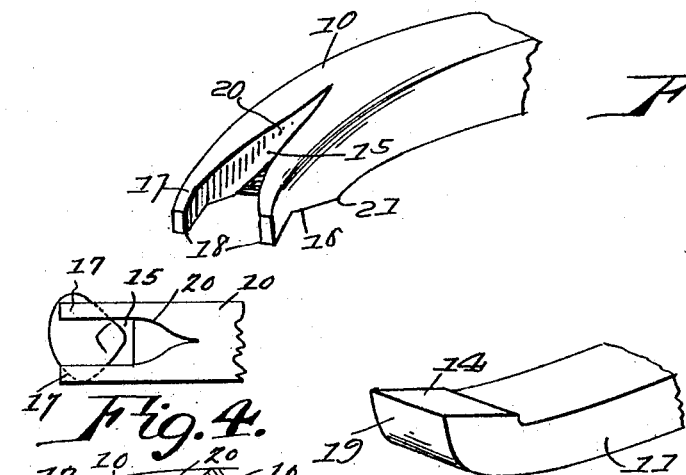
*Fig. 2.*
*Fig. 4.*
*Fig. 3.*
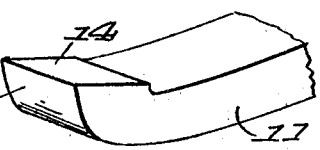
*Fig. 5.*
Inventor
George R. Weller,
by
Attorney

UNITED STATES PATENT OFFICE.

GEORGE R. WELLER, OF MOUNT PULASKI, ILLINOIS.

SEED-CORN-TESTING IMPLEMENT.

1,411,823.  Specification of Letters Patent.  Patented Apr. 4, 1922.

Application filed September 16, 1920. Serial No. 410,783.

*To all whom it may concern:*

Be it known that I, GEORGE R. WELLER, a citizen of the United States of America, residing at Mount Pulaski, in the county of Logan and State of Illinois, have invented new and useful Improvements in Seed-Corn-Testing Implements, of which the following is a specification.

The object of the invention is to provide simple, relative inexpensive and convenient tool or implement for facilitating the testing of corn kernels to determine accurately the seed value thereof, and more particularly to provide a means whereby a selected kernel of an ear of corn may be readily opened or split so as to expose the sprout to the view of the operator to enable him to determine whether or not the ear from which such kernel has been selected is of such a quality and vitality as to adapt it for use as seed corn, and therefore such as should be put aside for use in sowing for the ensuing crop, and with this object in view the invention consists in the construction and combination of parts of which a preferred embodiment is shown in the drawing, wherein:

Figure 1 is a side view of the implement.

Figure 2 is a perspective view of one of the jaws of the tool.

Figure 3 is a similar view of the other jaw.

Figure 4 is a detail view showing the action of the jaws of the tool in splitting the kernel to expose the sprout.

Figure 5 is a central vertical sectional view through the structure of Figure 4.

In the testing of corn for the purpose of selecting suitable seed corn it is necessary to take into consideration the number of characteristics of the kernels of the corn and particularly the sprouts which are rendered accessible and visible only by opening the kernel, and to this end in accordance with the usual practice a kernel or a number of kernels from an ear are selected and either by the aid of a knife or by biting the kernel the interior is exposed to view, so that the operator may determine by the color and general appearance of the sprout which springs from the sprout or inner end of the kernel toward the outer or closed end thereof, whether or not it is of the grade or stock to be reproduced and possesses the required vitality to result in the grade of crop which is desired, and it is obvious that such usual operation is slow and tedious and is more or less open to objection by reason of the fact that such crude means of opening the kernel frequently serves to destroy or injure the sprout so that its proper character and qualifications can not be accurately determined.

In order to save time and facilitate the opening of the kernel, and produce the sprout uninjured and undistorted to the view of the operator, it is proposed to employ an implement which in the construction illustrated is in the usual form of a pair of pliers having the jaws 10 and 11 pivotally connected as at 12 and provided with handles 13, the operation being, after selecting the kernel to be tested, to insert the latter sprout under foremost between the jaws and then force the jaws toward each other by a corresponding movement of the handles 13, to open up or split the kernel and bring the sprout into plain view. The jaws are of a relative construction designed to produce the desired effect upon the kernel and to this end respectively serve to support the kernel at one side and at the same time apply to the opposite side of the kernel pressure tending to split the kernel longitudinally and transversely. The under or nether or supporting jaw 11 for this purpose is provided with a table 14 preferably having an inclined bearing surface for supporting the kernel while the upper or complemental or opposing jaw 10 is longitudinally slotted or split as shown at 15, the slit or slot having outwardly or forwardly divergent walls and inclined bearing faces 16 opposed to the bearing face 14 of the nether jaw, the terminals of the prongs 17 formed by the slit or slot being turned down or toward the plane of the nether jaw and in overlapping relation therewith to provide horns 18 which pass down close to the under surface 19 of said nether jaw. The inner portion of the tapered slot or slit 15 of the upper jaw (it being understood that the terms "upper" and "lower" or "nether" as applied to the jaws is merely for convenience in distinguishing between them and as indicating the preferred relative position thereof in use) is intersected by a web 20 of which the upper surface is disposed obliquely to the plane of the jaw and terminates at 21 in an edge which serves to bear upon the extreme end or stem of the kernel as the jaws are brought toward each other into engagement with the kernel.

The result of the action of the jaws is to produce pressure along the side edges of the kernel by the prongs or fingers 17 tending to cause a longitudinal split along the center of the upper side of the kernel within view through the slot while the downwardly directed prongs 18 force the closed or normally outer end of the kernel downward or folded over the under face of the supporting jaw so as to project the sprout upward into the space represented by the slot or slit of the upper jaw where it is plainly within view of the operator to enable him to determine whether or not the ear from which said kernel has been extracted should be preserved for seed corn or not.

Having described the invention, what is claimed as new and useful is:

1. An implement for the purpose described having relatively movable jaws of which one is provided with a supporting surface and the other is provided with spaced prongs for pressure upon an interposed kernel at opposite sides of the longitudinal center thereof.

2. An implement for the purpose described having relatively movable jaws of which one is provided with a supporting surface or table and the other is provided with laterally spaced prongs having forwardly divergent inner surfaces.

3. An implement for the purpose described having relatively movable jaws respectively provided with a supporting surface or table and a plurality of forwardly divergent prongs terminating in inwardly directed horns.

4. An implement for the purpose described having relatively movable jaws respectively provided with a supporting surface or table and a plurality of forwardly divergent prongs terminating in inwardly directed horns disposed beyond the extremity of the supporting surface or table of the first named jaw.

5. An implement for the purpose described having relatively movable jaws respectively provided with an inclined bearing surface or table and forwardly divergent prongs, the interval between said prongs being intersected by a web having an obliquely disposed upper surface terminating in a transverse edge in rear of the extremities of the prongs and flush with the lower surfaces thereof.

In testimony whereof he affixes his signature.

GEORGE R. WELLER.